(12) United States Patent
Brush

(10) Patent No.: US 11,085,511 B1
(45) Date of Patent: Aug. 10, 2021

(54) POSITIVELY-ENGAGED INFINITELY-VARIABLE TRANSMISSION

(71) Applicant: Ethan Brush, Omaha, NE (US)

(72) Inventor: Ethan Brush, Omaha, NE (US)

( * ) Notice: Subject to any disclaimer, the term of this patent is extended or adjusted under 35 U.S.C. 154(b) by 0 days.

(21) Appl. No.: 16/554,009

(22) Filed: Aug. 28, 2019

Related U.S. Application Data

(60) Provisional application No. 62/723,844, filed on Aug. 28, 2018.

(51) Int. Cl.
| | |
|---|---|
| *F16H 3/76* | (2006.01) |
| *F16H 1/48* | (2006.01) |
| *F16H 57/00* | (2012.01) |
| *F16H 1/30* | (2006.01) |

(52) U.S. Cl.
CPC ............... *F16H 3/76* (2013.01); *F16H 1/30* (2013.01); *F16H 1/48* (2013.01); *F16H 57/0025* (2013.01)

(58) Field of Classification Search
CPC ..... F16H 1/30; F16H 1/48; F16H 3/76; F16H 57/0025
USPC ......................................................... 475/169
See application file for complete search history.

(56) References Cited

U.S. PATENT DOCUMENTS

| | | | | |
|---|---|---|---|---|
| 1,926,667 A | * | 9/1933 | Davis | D01H 7/604 |
| | | | | 475/198 |
| 2,118,423 A | * | 5/1938 | Timmermann | F16H 33/08 |
| | | | | 475/258 |
| 2,546,282 A | * | 3/1951 | Warren | F16H 29/20 |
| | | | | 74/63 |
| 6,119,539 A | * | 9/2000 | Papanicolaou | F16H 29/04 |
| | | | | 74/112 |
| 8,490,507 B2 | * | 7/2013 | Sun | F16H 23/02 |
| | | | | 74/60 |
| 2019/0219139 A1 | * | 7/2019 | Hochstetler | F16H 57/0025 |

* cited by examiner

*Primary Examiner* — Leslie A Nicholson, III
(74) *Attorney, Agent, or Firm* — Mallory M. Henninger; Advent, LLP

(57) ABSTRACT

A positively-engaged infinitely-variable transmission (PE-IVT) system employs a gear assembly including a first helical gear and a second helical gear meshed with the first helical gear. The first helical gear is divided into a plurality of gear segments that can individually move axially along a spline shaft. The PE-IVT system further includes a swash-plate configured to constrain the axial motion of the plurality of gear segments. In some embodiments, the system further includes one or more thread-aligners configured to axially align a gear segment with one or more additional gear segments. In some embodiments, the second helical gear is also divided into a plurality of gear segments.

18 Claims, 11 Drawing Sheets

POSITIVELY-ENGAGED INFINITELY-VARIABLE TRANSMISSION

BACKGROUND

A continuously variable transmission (CVT), also known as a single-speed transmission, stepless transmission, pulley transmission, or, in case of motorcycles, a twist-and-go, is an automatic transmission that can change seamlessly through a continuous range of effective gear ratios.

DRAWINGS

The Detailed Description is described with reference to the accompanying figures. The use of the same reference numbers in different instances in the description and the figures may indicate similar or identical items.

DETAILED DESCRIPTION

Figure 1:
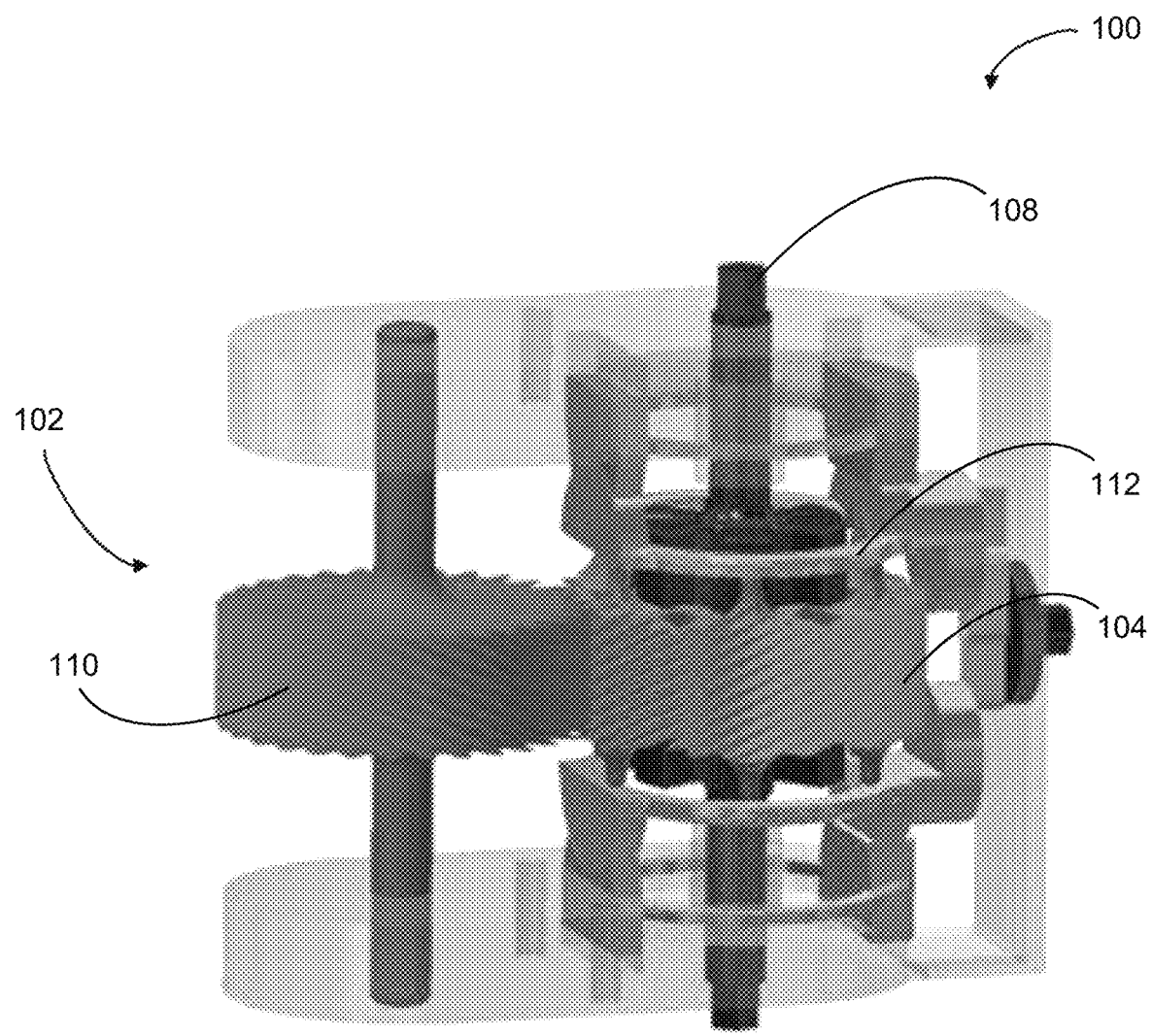
FIG. 1 is an isometric view illustrating a positively-engaged infinitely-variable transmission including a gear assembly, the gear assembly including helical gears in accordance with an example embodiment of the present disclosure.

Continuously variable transmissions (CVTs), and the subset known as infinitely variable transmissions (IVTs) with gear ratio ranges reaching zero (0:1 or 1:∞ or "geared neutral"), offer motors the ability to run in preferred angular velocity ranges independent of transmission output speed, which can allow optimization for power, torque, and efficiency. Usually with an emphasis on efficiency and smoothness, small to mid-sized vehicles with internal combustion engines (ICEs) may utilize variable-diameter pulley CVTs rather than automatic transmissions. Larger vehicles remain with automatic transmissions because today's friction-driven CVTs are unable to provide the large torque required for towing applications while maintaining acceptable efficiency and durability, since the frictional losses of conventional CVTs increase while trying to prevent belt slippage as torque demands increase. Slippage increases wear along with noise, vibration, and harshness, and the CVT's historical tendency to slip under load and the issues this causes have led to widespread consumer apprehension concerning CVTs. Alongside that and the increased complexity and cost associated with the need for hydraulic systems for conventional CVTs, electric vehicles forego CVTs because their limited torque capability reduces performance enough to outweigh the benefit of higher efficiency. In the interest of increasing both efficiency and torque capability, attempts have been made to develop CVTs/IVTs with positive engagement (PE, non-friction-driven). However, these attempts have either been limited by oscillating/jerky output and/or by a meshing problem known as the Non-Integer-Tooth Problem (NITP). The NITP is manifest when the effective diameter of integer-based members such as gears or chains is increased. These integer-based members have a specific spacing between each segment around their circumference such as is found in gear teeth. As the diameter is increased, the segment length, or spacing between teeth, must remain the same which causes an overlap or partial segment that does not function properly until the next full segment or integer is attained. Dedicated Hybrid Transmissions (DHTs), while often advertised as PE-IVTs, are differentials posing as IVTs by exploiting a secondary electric motor's flatter efficiency curve to alter the gear ratio; therefore, they also suffer from circulating power loss and are limited in application.

The problem is coming to a point as EVs, including electric trucks, are becoming more prevalent and desperately need new transmissions suitable for their use; without transmissions EVs have decreased range, limited regenerative braking, decreased acceleration, higher heat due to lower efficiency, and lower top speeds, all of which lead to bigger batteries and bigger motors which need bigger cooling systems, all increasing cost to the consumer for decreased performance. EVs can be considered a subset of the field of robotics, and their drivetrain efficiency issues translate to the rest of the field. PE-IVT embodiments described herein may be utilized not just for large applications like EVs but also less demanding and more cost-effective implementations for other robotic applications.

Aspects of this disclosure relate to a positively-engaged infinitely-variable transmission (PE-IVT) system having a gear assembly including a first helical gear and a second helical gear meshed with the first helical gear. The first helical gear is divided into a plurality of gear segments that can individually move axially along a spline shaft. The PE-IVT system further includes a swashplate configured to constrain the axial motion of the plurality of gear segments. In some embodiments, the system further includes one or more thread-aligners configured to axially align a gear segment with one or more additional gear segments. In some embodiments, the second helical gear is also divided into a plurality of gear segments.

Referring generally to FIGS. 1 through 13, PE-IVT systems 100 are described. As disclosed, herein, the PE-IVT system 100 employs a gear assembly 102 including helical gearing (e.g., as described with reference to FIG. 1). Helical gear teeth produce axial forces as they rotate; in this regard the helical teeth act like the threads of a screw, except that in typical operation of helical gears axial motion is constrained. In a meshed pair of helical gears, if one is rotationally locked while the other tries to rotate against it, it would climb axially like a screw, transforming all the rotational movement to axial movement. If the helical gear is allowed some limited axial motion while the rest is transmitted as rotation, then the effective gear ratio of the gear pair is changed, as the axial motion directly subtracts from the transmitted rotational motion.

To form an IVT, axial motion is looped infinitely and with varying proportions. In some embodiments, the gear assembly 102 of the PE-IVT system 100 includes a first helical gear 104 split into radial gear segments 106 (e.g., radial slices like a pie). The gear segments 106 can individually move axially on a spline shaft (e.g., straight-splined shaft 108), and are meshed with a second helical gear 110 (e.g., a regular helical gear). In embodiments, the axial motion of the helical gears 104, 110 is constrained by a mechanical linkage, for example, a swashplate 112 or an axial cam. The swashplate 112 constrains the axial motion of the gear segments 106 such that they move in an elliptical orbit of which the eccentricity and direction can be determined by the angle of the swashplate 112. In some embodiments, revolute joint of the swashplate 112 lies in the plane of the paired gears' 104, 110 axes, so it ensures that whatever axial motion is experienced by a gear segment 106 while in mesh occurs with equal magnitude and opposite direction for the segment 106 directly opposite it. This arrangement effectively loops the screw-like motion of the split gear 104, while the swashplate 112 angle directly controls the gear ratio.

Figure 2:
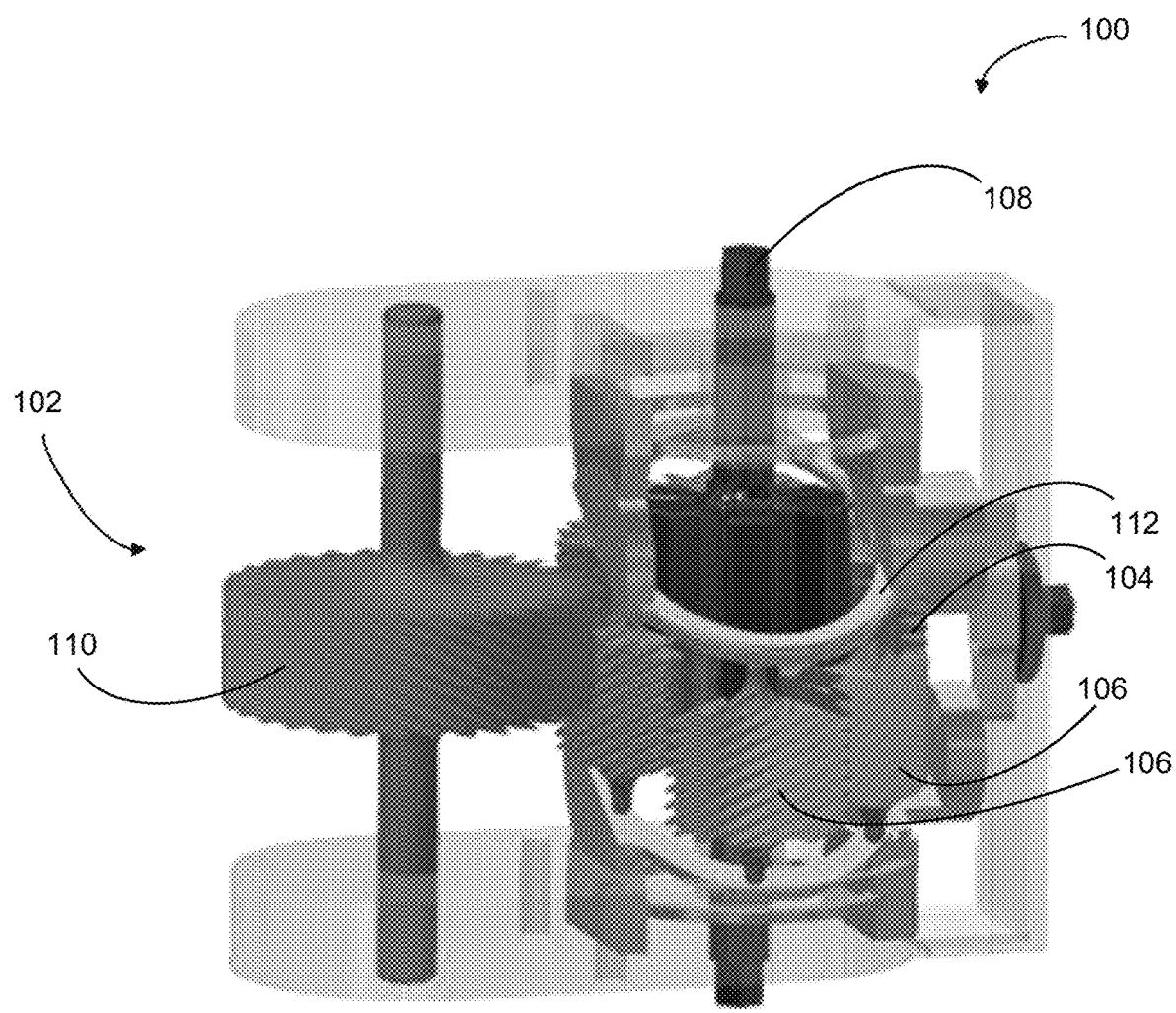
FIG. 2 is another isometric view of the positively-engaged infinitely-variable transmission illustrated in FIG. 1, with a swashplate shifted to add teeth.
Figure 3:
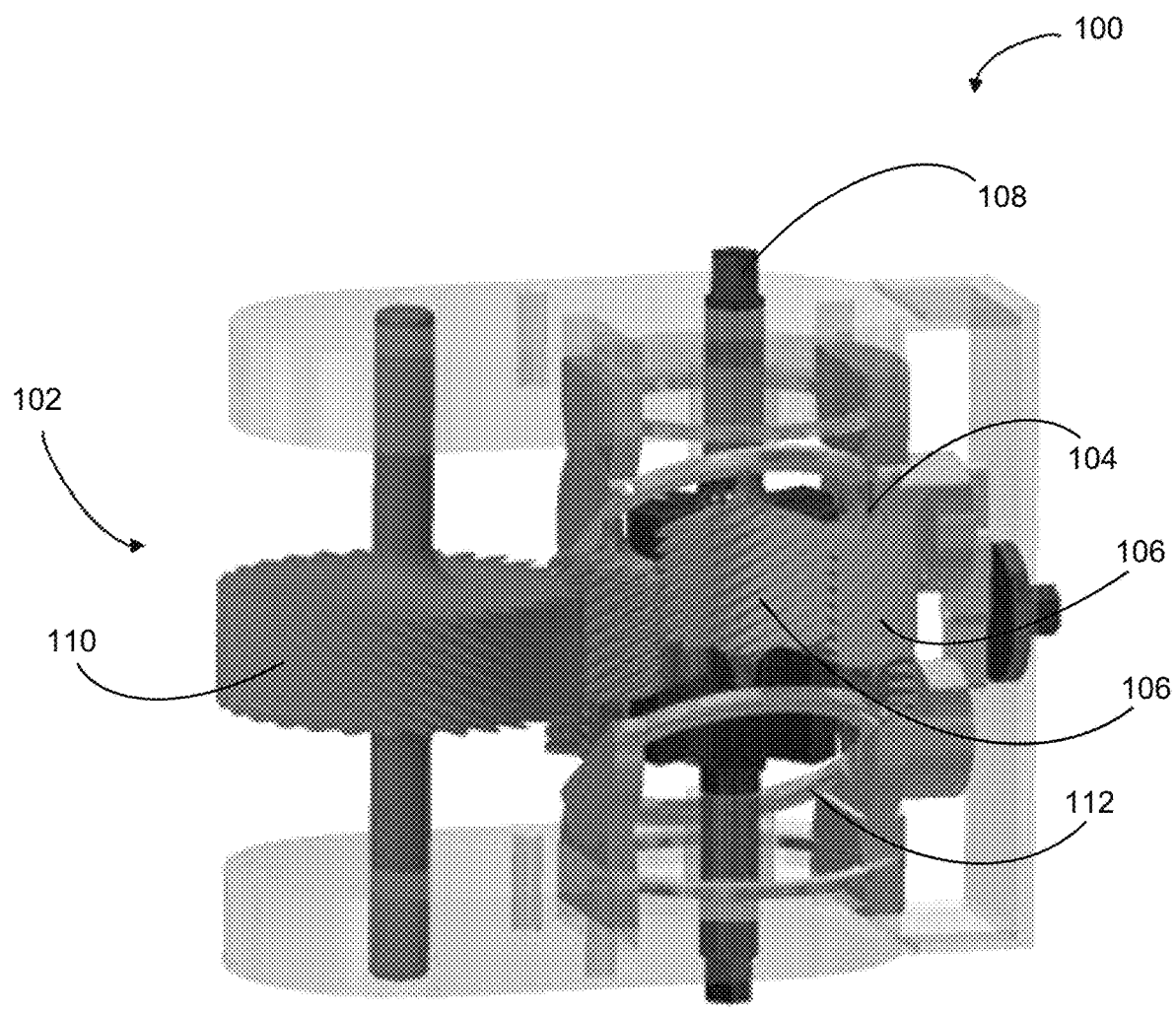
FIG. 3 is another isometric view of the positively-engaged infinitely-variable transmission illustrated in FIG. 1, with a swashplate shifted to skip teeth.
Figure 4:
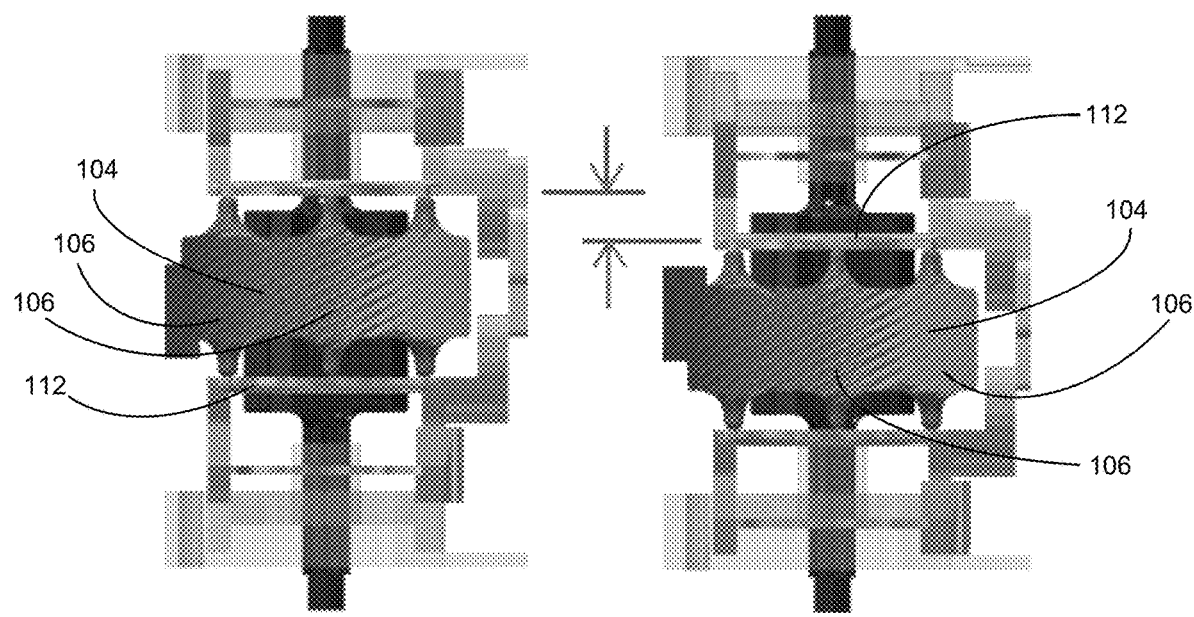
FIG. 4 is a front view of the positively-engaged infinitely-variable transmission illustrated in FIG. 1, including sprung axial freedom of the whole gear.
Figure 5:
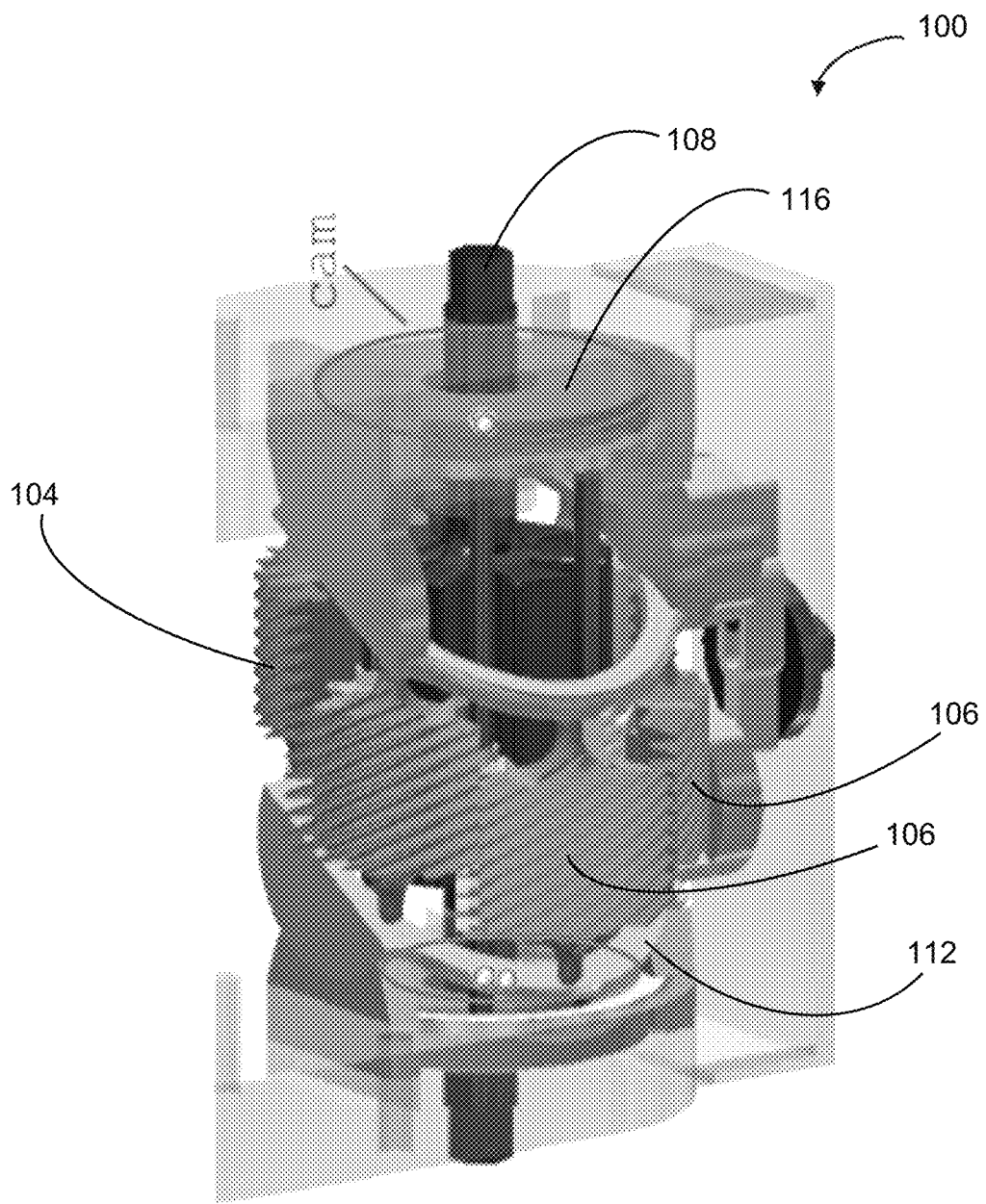
FIG. 5 is an isometric view of a helical gear of the gear assembly illustrated in FIG. 1, the gear assembly including radial cams and thread-aligners in accordance with an example embodiment of the present disclosure.
Figure 6:
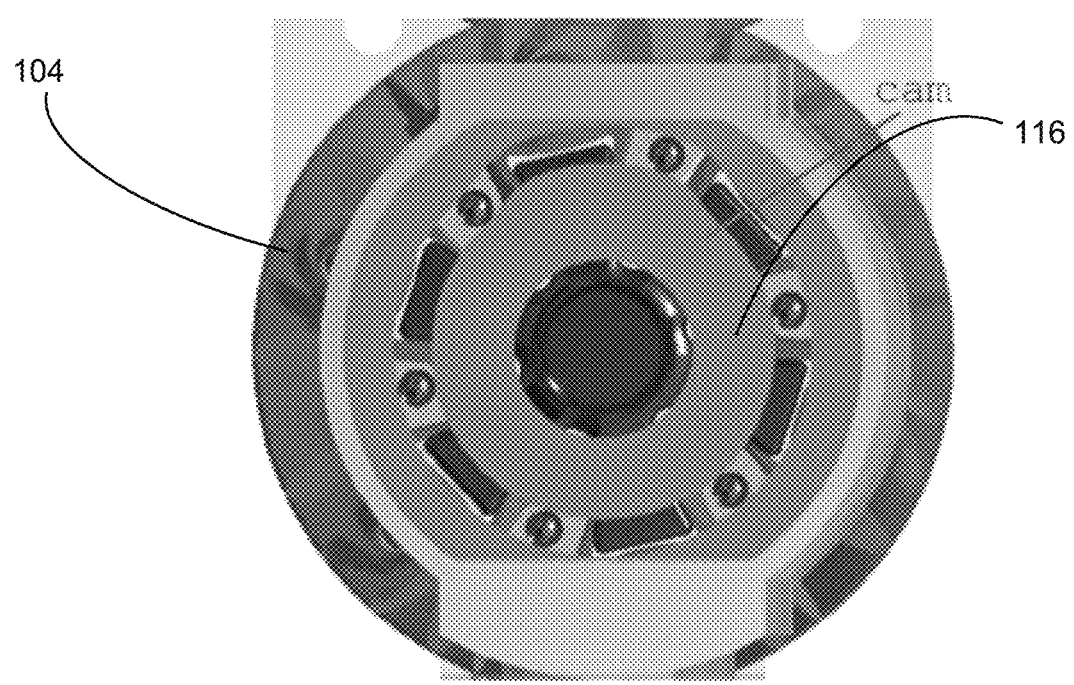
FIG. 6 is top view of the radial cam illustrated in FIG. 5.
Figure 7:
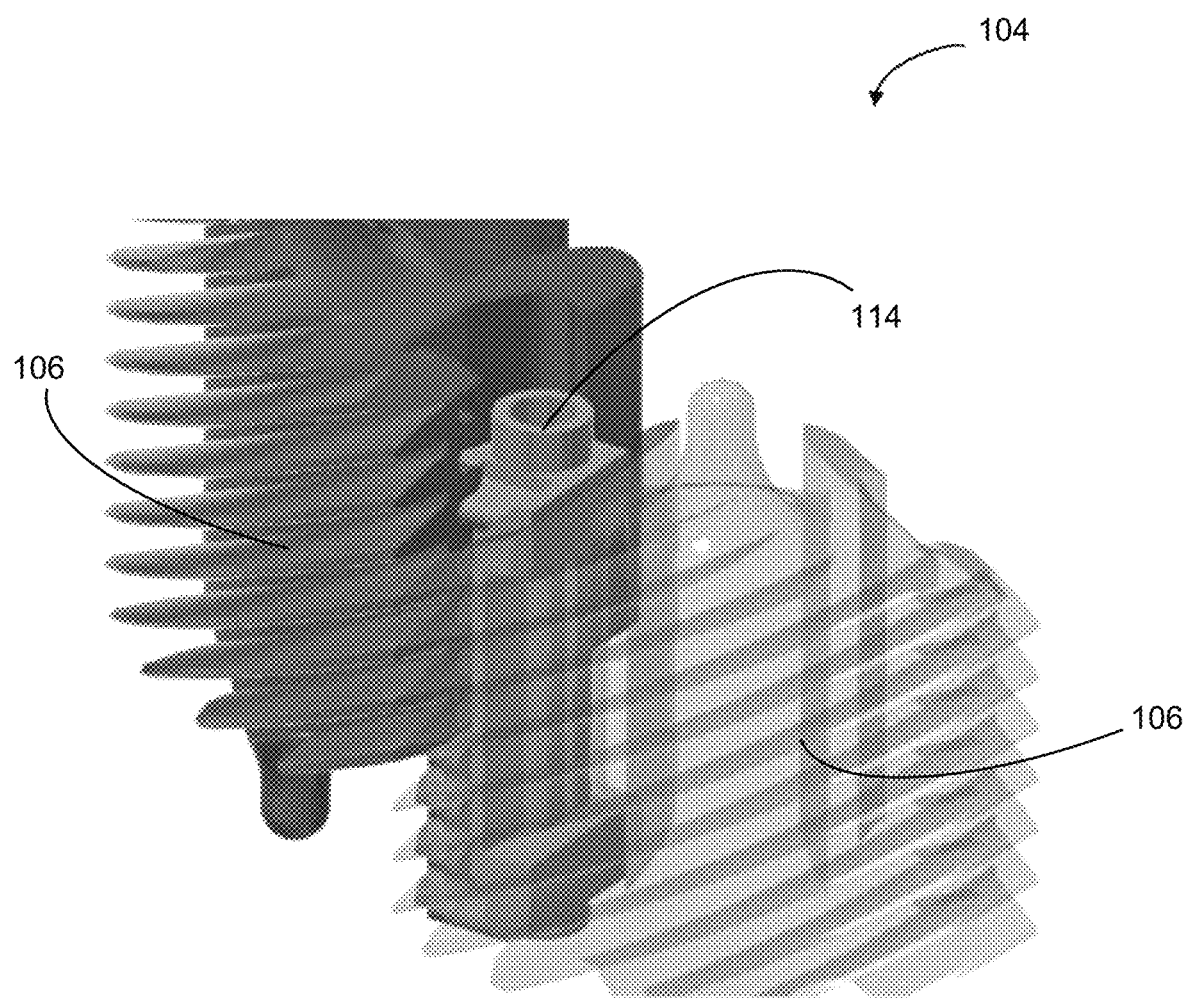
FIG. 7 is an isometric view a plurality of gear segments and a thread-aligner of the helical gear illustrated in FIG. 5.
Figure 8:
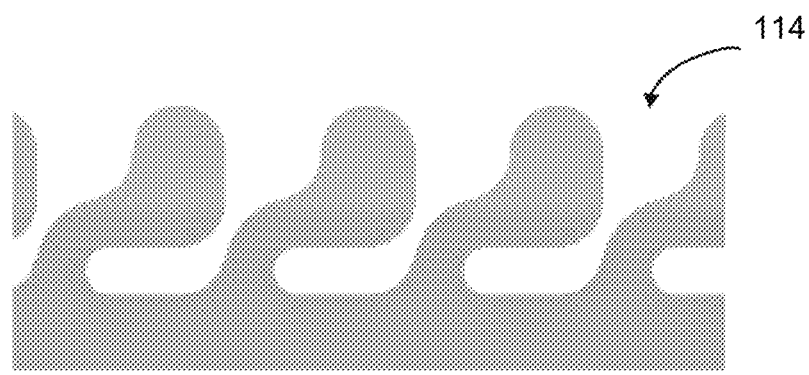
FIG. 8 is a plan view of a rack of teeth of a thread-aligner, such as the thread-aligners illustrated in FIG. 7, the rack having asymmetrically compliant teeth in accordance with an example embodiment of the present disclosure.

Referring now to FIGS. 1 and 2, the swashplate 112 can only have as many allowed angular positions as the number of teeth intersected per slice, because it needs to line up the teeth prior to entering gear mesh to ensure smooth operation with low wear on tooth flanks. Every allowed position represents a certain gear ratio. When the swashplate 112 is flat it runs like a normal gear, with no axial motion of the gear segments 106. The next allowed position, in which the nth tooth of each gear segment is aligned with every (n−1)th tooth of the next gear segment, is basically adding a gear tooth to each of them. For example, if the gears 104, 110 both initially had 30 gear teeth with 6 gear segments 106, the new gear ratio could be 36:30 (6:5). The next position would add two teeth each time, so its gear ratio could be 42:30 (7:5). FIG. 2 illustrates a 66:30 (11:5) gear ratio. The maximum attainable gear ratio depends on the number of teeth intersected by the axial/radial split plane, on the edge of the segments 106. If that same gear was thick enough that 5 teeth were intersected on each slice, then the maximum gear ratio would be 60:30 (2:1), or if it was 7 teeth thick it could go all the way to 72:30 (12:5). In some embodiments, the number of intersected teeth is limited by practicality, since the swashplate 112 eventually encroaches on the space the segments 106 occupy, or the helix angle becomes too fine for production (this is expanded upon in the Kinematics section). If the swashplate 112 tilts in the other direction, then the threads align such that they effectively skip teeth (e.g., as described with reference to FIG. 3). Continuing the previous example, the (−1)th position of the swashplate would produce a gear ratio of 24:30 (4:5). At the lowest position, every tooth is skipped, which is when the swashplate 112 angle equals the helix angle, and the gear ratio is 0:30 (1:∞). In some embodiments, the swashplate 112 shifts rapidly yet smoothly enough that it can produce gear ratios such as 31:30 by only adding a tooth to one gear segment, or 35:30 by adding a tooth to all but one segment, for example. It can even add just one tooth every other revolution, creating a gear ratio of 61:60. Utilizing the techniques described herein, the swashplate 112 can reproduce an infinite number of gear ratios within its continuous range. While this might be construed to imply that the gear ratios are not reproduced instantaneously, this can solve the NITP, as described below.

As a stepped transmission, the system 100 may provide the benefit of a more compact package than other discrete-stepped transmissions, since many gear ratios are offered by a single gear pair, and since it does not require synchromesh clutches it may also shift more rapidly and efficiently (like a dog-clutch transmission). However, in some embodiments, it is contemplated that a system to positively align the tooth-threads prior to entering mesh can be implemented; otherwise the alignment required to correct imprecise gear shifts would occur on the flanks of the gear teeth as they enter mesh, sliding upon each other to achieve the required axial position. This presents a risk of excess wear but could also introduce critical failure to the system if the teeth of the gear slice and pinion can contact point-to-point such that realignment is impossible. In some embodiments, the tips of the edges of the teeth compliant such that they will always glance to one side (e.g., thread-aligners which align the threads of the helical teeth). These embodiments may work for many low-power implementations of this system 100. In other embodiments, a more rigorous mechanical solution may be desired for high-performance applications.

To accommodate these shifts, some axial degree of freedom may be introduced to the system 100, sprung towards equilibrium. It can offer some degree of freedom to the thread-aligners within which they can be adjusted. In some embodiments, this is done by springing the length of the swashplate-followers of each gear segment 106, and/or the swashplate 112 angle itself via a radial spring of limited motion between it and the control input. Springing the length of the swashplate-followers of each gear segment 106 can be effective when the gear segments 106 are extremely massive. Springing the swashplate 112 angle itself can be used to simplify the assembly.

In some embodiments, smooth shifts allow for shifting back and forth so rapidly (e.g., for a split-helical gear with 'n' segments 106 each shift occurs within 1/n revolution) to output an average gear ratio between the two, which leads directly to implementing a CVT if the output can be smoothed out. For example, the highest possible shift frequency is every 1/n revolution, which would happen when evenly splitting in half between two gear ratios. The shift frequency diminishes as the effective gear ratio approaches the discrete ratios, solving the NITP.

In some embodiments, the system 100 can further solve the NITP by storing and distributing the remainders and borrowed fractions produced by the thread-aligners rounding the gear to the nearest integer number of teeth. In some embodiments, the output shaft can be cut in two sections, with a radial spring attached between them, to act as an "averager." Such a system 100 would borrow and lend energy as required. In some embodiments, an infinitely long spring may be required to truly solve the NITP.

In other embodiments, the springs acting upon the gear segments 106 themselves can perform this second function. When the gear segments 106 are at the center point of the gear mesh, they have the same axial position, regardless of their axial velocity. This means that they will output an integer number of teeth. However, if the whole gear 104 has an axial velocity as well, then effective non-integer teeth can be generated. Adding a spring to one whole gear 104 to give it some axial position freedom accomplishes this, when paired with springing the length of the swashplate-followers of each gear segment 106, and/or the swashplate 112 angle itself. Effectively this means that every time the thread-aligners adjust the relative position of adjacent gear segments 106 as one is about to enter mesh, they also move the whole gear 104 slightly, meaning the remainders are stored and borrowed from the two springs. Given this sprung degree of freedom (e.g., as described with reference to FIG. 4), the transmission can solve the NITP and instantaneously produce any gear ratio within its continuous range. This embodiment can be sufficiently smooth for situations in which the input and output both have high rotational inertia, such as an automotive application. It is contemplated that sprung axial freedom may be utilized with the first helical gear 104, the second helical gear 110, or both.

In other embodiments, the system 100 can include actuators alone and/or in combination with springs to control the positions described above. For example, for situations with less rotational inertia and a need for precision and low backlash, like in precision robotics, a more active approach may be necessary.

Referring now to FIGS. 5 through 9, the system 100 further includes at least one thread-aligner 114 to align the heads of the helical teeth, as described above. The thread-aligner 114 is configured to shift segments 106 axially relative to each other. In some embodiments, the thread-aligner 114 includes compliant tips of teeth on the boundaries of gear segments 106—such that they bend to one side to force alignment if the tips jam against the meshed gear. This may be suitable for low-cost implementations; however, the high jerk and wear of these embodiments may not be satisfactory for high-end applications like automotive transmissions or precision robotics. In such applications, it may be beneficial for the teeth (threads) of adjacent gear segments 106 to align and lock together prior to engagement to avoid excessive acceleration and jerk. This specifies axial translation of a gear segment 106 relative to its adjacent (already meshed) gear segment 106, not axial translation relative to the whole gear assembly, so the control surfaces must be contained on the gear segments 106 themselves. Since the thread-aligners 114 are then isolated from the rest of the gear assembly 102 and are thus uninformed of the gear's angular position, they are actuated via an axially-sliding follower of a thread-aligner linkage (e.g., radial cam 116) at the boundaries of the gear assembly 102 (e.g., as described with reference to FIGS. 5-7). In some embodiments, this radial cam 116 has a single lobe centered at the mesh point and extending slightly further than the mesh to ensure engagement prior. Between each gear segment, on the splitting plane, is the thread-aligner 114, and the axially-free followers of the radial cam 116 sit between each shaft spline.

Given that radial input, the thread-aligner 114 can take two adjacent gear segments 106 at unknown (random) relative axial positions and lock them together at a relative axial position corresponding to an integer number of tooth-lengths. In some embodiments, two racks of rounded teeth are meshed together (e.g., like a stubby, rounded comb as described with reference to FIG. 8), one facing towards the shaft and the other faces outwards, with a radial motion imparted by the radial cam 116. Since one rack is connected to one gear segment and the other rack is connected to the other gear segment, the racks meshing together locks the two gear segments 106 together. This embodiment locks with some lead time before engagement, leading to less jerk and wear than embodiments employing compliant teeth. The tooth shape can remain abstracted as a circle or ellipse without loss of generality. The two racks mash together to perform a floor/ceiling function of the relative axial position of the gear segments 106, but it may not offer a solution for the rare scenario in which the relative position difference is exactly a half tooth-length.

In embodiments, the teeth of the comb/rack can be arranged to prevent jamming. In some embodiments, the teeth of the comb/rack can be asymmetrically compliant (e.g., as described with reference to FIG. 8). In other embodiments, the thread-aligner 114 can include a third rack having a rack of teeth with a saw-tooth profile, and the other two racks are slightly lengthened (e.g., as described with reference to FIG. 9). The round-toothed rack with which the saw-toothed rack is paired receives a short spring connection to the saw-toothed rack, and the remaining round-toothed rack doubles in width so the pair has room to contact together. This arrangement allows the round racks to touch first and operate as normal most of the time, but if they jam tip-to-tip then that spring gets compressed and the saw-toothed rack contacts the wide rack, pushing them off center and ensuring a proper mesh.

In still other embodiments, replacing the round teeth within the racks with rollers may increase the efficiency of the system 100, but it may not be desirable or practical for certain sizes.

Figure 9:
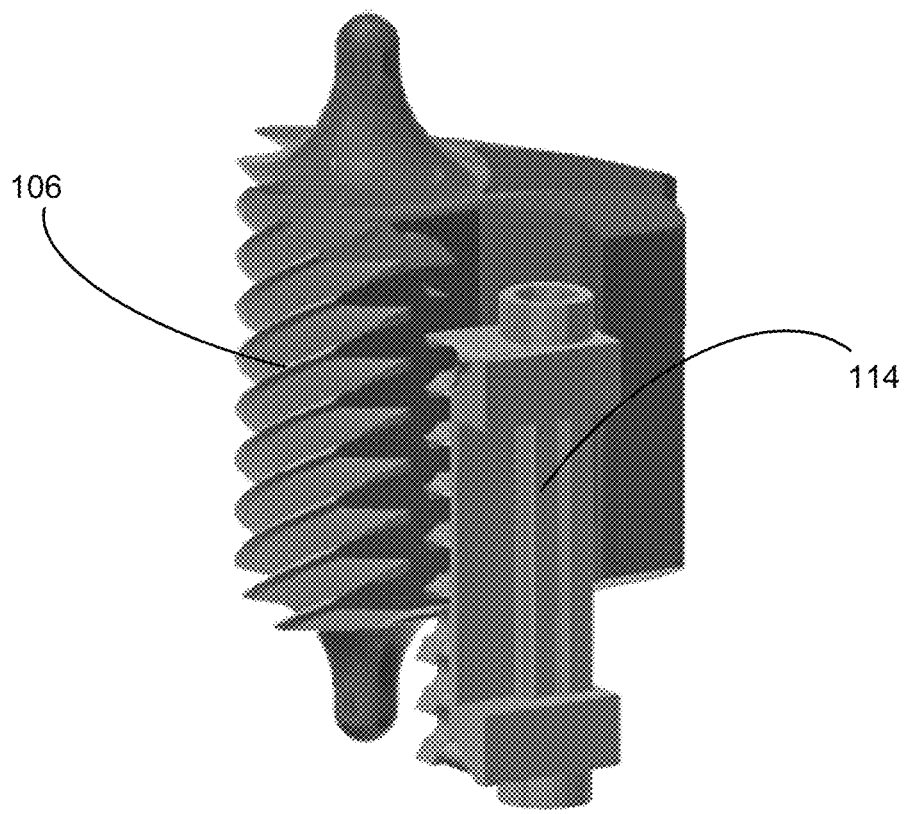
FIG. 9 is an isometric view a of gear segment and a thread-aligner of the helical gear illustrated in FIG. 5, the thread-aligner including a rack of teeth with a saw-tooth profile.
Figure 10:
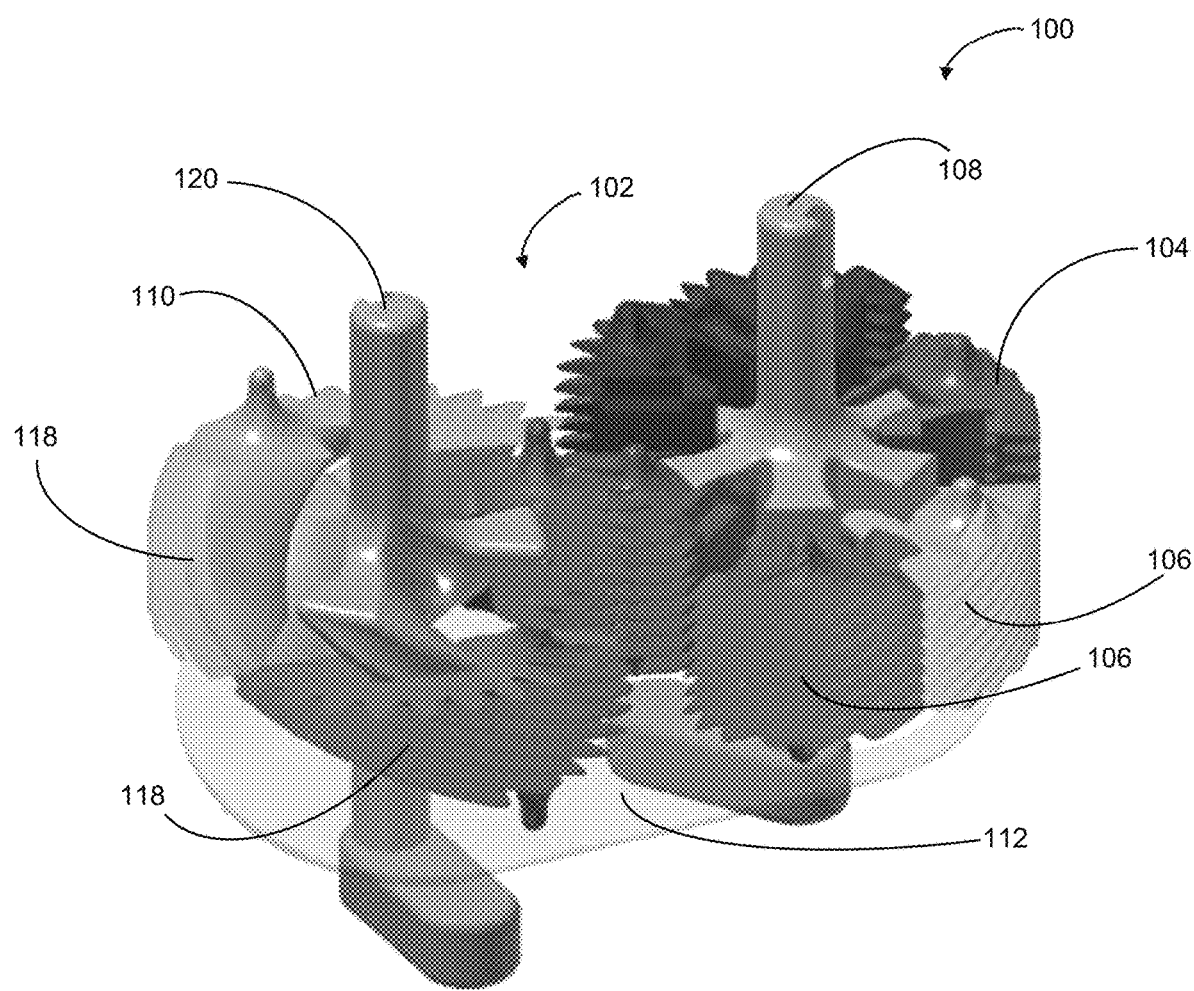
FIG. 10 is an isometric view of a gear assembly of the positively-engaged infinitely-variable transmission illustrated in FIG. 1, the gear assembly including a helically-split gear and a straight-split gear.
Figure 11:
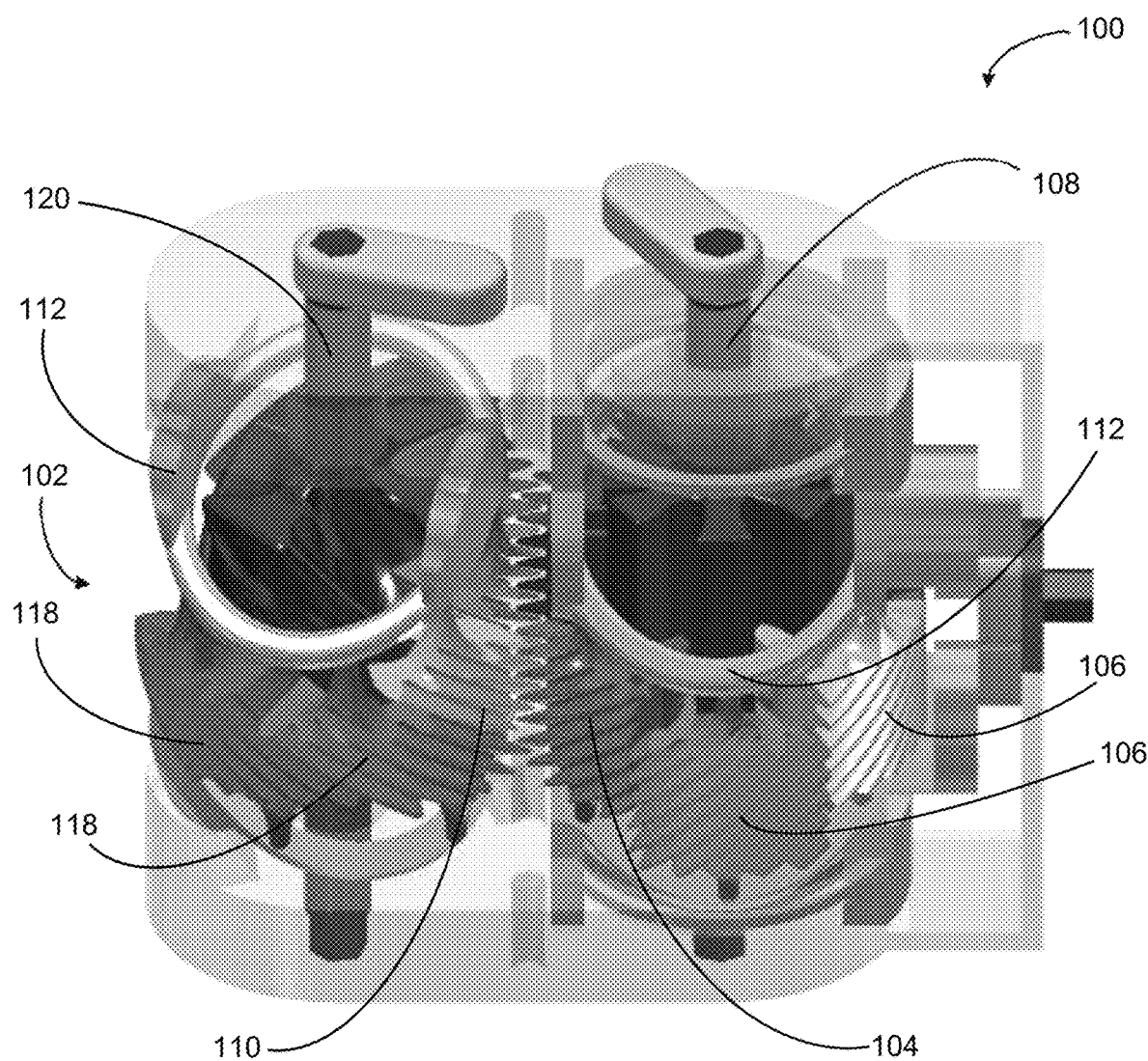
FIG. 11 is another isometric view of a gear assembly of the positively-engaged infinitely-variable transmission illustrated in FIG. 1, the gear assembly including a helically-split gear and a straight-split gear, the helically-split gear and the straight-split gear having offset swashplates.

Referring now to FIGS. 9-11, techniques and methods can be implanted to increase the efficiency of the PE-IVT devices and systems 100 described herein. By looping the axial motion of gear segments 106 such that they emulate an infinitely long screw, this transmission may lose efficiency (e.g., due to sliding friction) as the gear ratio deviates from 1:1, acting proportionally more like a screw. In some embodiments, the system 100 can utilize a ball-screw. Ball-screws use nuts with recirculating ball bearing races shaped in helices to conform to the shape of the screw such that the ball bearings roll along the threads rather than the typical sliding contact present in traditional leadscrews. The system 100 can include a large ball-nut to annularly mesh with the split-helical-gear on its allowable contact range. For example, the ball-nut can include a bearing retainer surface to keep the balls in the races when they are not in mesh with the split helical gear. Alternatively, the nut's recirculation tube and bearing race may be inverted, such that the ball bearings return down the center of the worm, to provide for an external gear pair. In some embodiments, "recirculating ball worm" drives are used to reduce the ratio of sliding to rolling contact within worm gear pairs, just like ball screws. However, the reticulating ball worm drive may increase manufacturing costs has limited torque capability in comparison to simple worm gears. Its torque capability is directly related to how many balls are in contact at any given time, which is why many ball worm gear designs use throated worms and/or throated worm wheels. In the embodiments described herein, the ball worm drive includes a parallel axis like a helical gear, rather than crossed-axis like these other applications. This allows the two pitch cylinders to have line contact rather than point contact. As described below, this naturally increases the number of balls in contact at once, especially given that these gears would be thicker than most gears, making this a viable method to increase efficiency for some applications. Efficiency and operational lifetime can be further improved using plastic spacer cups or "spacer balls," which are of smaller diameter than the regular ball bearings and roll backwards like idlers, to reduce harmful sliding contact between loaded ball bearings.

In some embodiments, the second gear 110 is split into slices. For example, the second gear 110 can be split along the helical axis of the teeth into a plurality of helical slices (e.g., gear segments 118; as described with reference to FIG. 10). The gear segments 118 are arranged on a helically-splined shaft 120 such that these gear segments 118 can translate individually in a helical motion on the shaft.

In a specific embodiment, the first helical gear 104 is configured as a straight-split gear and the second helical gear 110 is configured as a helically-split gear. In such embodiments, swashplates 112 can constrain the axial position with respect to angular position of the shaft, like on the primary gear, the straight-split gear 104. Splitting and splining helically along the helix of the teeth, rather than straight and axially, couples the axial position to the angular position. As the gear rotates while the swashplate 112 forces the segments 118 to translate axially, their angular velocity is modulated by the helical splines, such that their angular position periodically shoots past, and then lags behind, the angular position of the shaft. It is contemplated that the gears 104, 110 can share a swashplate 112 and/or a swashplate follower (e.g., as described with reference to FIG. 10). In other embodiments, each of the gears 104, 110 can have a swashplate 112 (e.g., as described with reference to FIG. 11).

In some embodiments, the helically-split gear 110 goes faster on one side than the other, while their average velocity is equal to the shaft velocity. The minima and maxima of the velocity of the segments 118 occur directly opposite and at the same axial position (z=0), which is where the gear mesh should happen. If the swashplates 112 of the two gears 104, 110 are set to the same angle, then the gear segments 106 of the straight-split gear 104 and the gear segments 118 of the helically-split gear 110 travel with the same axial velocity and angular velocity (if the two gears 104, 110 are the same diameter) at the mesh point even while producing a different gear ratio between the two shafts 108, 120, as the segments 118 catch up with the helically-splined 120 shaft as they exit mesh.

This helically-split second gear 110 can increase efficiency of the gear mesh by removing the sliding friction within the gear mesh caused by relative axial motion of the two gears 104, 110 (which happens as the straight-split gear acts like a screw) and relocating the sliding motion to the helically-splined 120 shaft. Sliding along the splines is more efficient than sliding along teeth because the splines can be made of a material with a lower coefficient of friction than the teeth, can hold a better film of lubricant, and could even be rolling element bearings set in helical bearing races. However, the angle of the swashplates 112 for the helically-split second gear 110 does not need to be constrained, since it only affects the efficiency, not the gear ratio in any way (since the split is along the helix of the teeth and does not intersect any teeth), so it can be left free to tilt to the a desired angle (e.g., the angle that produces the least friction).

When the swashplate 112 is tilted, and the gear segments 118 stack up on one side while accelerating by on the other side, the gear is effectively thicker on the slow side and thinner on the fast side (less contact area in mesh). This consequence of the helical segments 118 may limit the gear ratio range for which this is effective. It approaches a limit of thickness as the segments' 118 cam-followers begin to intersect with adjacent segments 106, so if the CVT starts to run beyond that range of the helically-split gear 110 then it will start imparting sliding motion along the teeth. The helically-split gear 110 would still relocate as much sliding as it can to the helically-splined shaft 120, but any excess would just happen along the teeth. On the other end of the spectrum, as the straight-split gear 104 spins much more slowly than the helically-split gear 110, the effective thinness of the helically-split gear 110 may become problematic. The helically-split gear's 110 torque capacity drops as its effective thickness reduces, and it approaches the swashplate 111 angle at which the gear 110 is no longer continuous on the fast side.

Thus, in some embodiments, the helically-split gear 110 is the driven gear, and the straight-split gear 104 is the driving gear. It can be used as an IVT, granted some sliding of teeth is affordable at the bottom of the range. In underdrive, if more torque is needed, a constraint can be added to the swashplates of the helically-split gear such that they do not let the effective thickness of the split-helical gear get too thin, and tooth sliding accordingly stops occurring later. For this reason, the helically-split gear 110 can be thicker than the straight-split gear 104. In most cases, such as automotive, the tooth sliding can occur at the low range, in which little time is spent after accelerating. If the shaft is running at low speed and low torque, it would be acceptable for the swashplates 112 of the helically-split gear 110 to tilt to a safe level that eliminates unnecessary sliding.

As the number of gear segments 118 grows beyond three, it may be necessary to offset the followers and slant the swashplates 112 accordingly such that slices do not intersect the followers of adjacent segments 118 when the angle of the swashplates 112 is large (e.g., as described with reference to FIG. 11). In embodiments, this does not affect the kinematics of the system 100; it just improves fit.

The efficiency gain is relative to the number of gear segments 118 of the helically-split gear 110, which can range from two to a maximum of as many segments 118 as there are teeth. With more teeth per segment 118, they engage earlier and leave the mesh region later, meaning that their teeth must slightly slide in then out of mesh as they approach and then depart the point at which perfect mesh occurs. Gear thickness also affects the amount of this "residual" sliding, since it too determines the duration of the mesh per segment 118.

Residual sliding of teeth may result from using swashplates 112 instead of more sophisticated axial cams, due to the slightly sinusoidal axial velocity curve of the gear segments 106 through the mesh region, rather than the ideally constant axial velocity which would be seen if the axial cam forced a helical path through the mesh region. It is contemplated that in some embodiments, the PE-IVT system 100 can include an axial cam of variable amplitude rather than a swashplate 112. Utilizing an axial cam of variable amplitude may produce that desired behavior better than a swashplate 112.

In some embodiments, tooth geometry can be selected to increase efficiency of the system 100. Tooth geometry can be non-involute to increase the proportion of rolling to sliding contact and to hold lubrication better when sliding. For example, conformal tooth geometry is one such tooth geometry. Conformal teeth are also stronger and more resistant to Hertzian stresses due to their convex-to-concave teeth (involute teeth are convex-to-convex). One reason that this advanced tooth geometry is rare today is that it is more sensitive to change in center distance than involute gear teeth, which can become an issue during excess heat expansion and which implies a need for more precise manufacturing. The need for precise manufacturing is taken further by the fact that conformal gears cannot be quickly hobbed like regular gear teeth; they must be shaped in pairs with a special tool, which could take longer. However, for applications that require advanced manufacturing techniques, using a non-involute geometry to increase efficiency and/or power density may be a desirable option.

In still other embodiments the teeth in the regular second helical gear 110 can be replaced with helical rows of tooth-shaped rollers. This turns the axial sliding into rolling motion, but at the cost of strength and size. This option would likely be best as an annular gear, due to the bearings/bushings required at the root of each roller tooth.

In some embodiments, the gear ratio for this system 100 is determined by the angle of the swashplate 112, which determines the number of teeth added or skipped per gear segment 106. For the sake of simplicity, in each example both gears 104, 110 will have the same diameter and number of teeth to start with, though this of course can be varied if desired. This means that when the swashplate 112 is completely flat ($\Phi=0°$) the gear ratio is 1:1.

Symbols:
w=tooth width (measured axially)
p=number of gear segments
$n_1$=number of real teeth of the first gear
$n_2$=number of real teeth of the second gear
$n_{\textit{eff}}$=effective number of teeth of the first gear
$\Phi$=swashplate angle (°)
r=radial position of the cam (swashplate) followers (°)
u=gear ratio
z=axial position $$n_{\textit{eff}} = n_1 + \frac{r * 2\sin\left(\frac{360°}{p}\right)\tan(\Phi)}{w} \quad (1)$$

$$u = \frac{n_2}{n_{\textit{eff}}} \quad (2)$$

Equation 1 calculates the maximum axial difference between adjacent gear segments 106 during mesh, then divides it by the axial width of the gear teeth to find the change in effective number of teeth, then adds the base number of teeth.

The helix pitch of these gears is rather low compared to most helical gears because that allows for more gear teeth to be intersected by the straight splits. A higher number of gear teeth translates to finer control of the gear ratio. The number of gear teeth and helix pitch angle are constrained by the usual manufacturing factors as well as by the size of the thread-aligner, which gets weaker as it gets smaller. The helix pitch also affects how much axial force is applied to the swashplate 112 and shaft bearings.

The number of gear segments 106 relates to the fineness of gear ratio control and the efficiency of the system 100. For example, a larger number of gear segments 106 means added complexity but higher efficiency if used with a swashplate 112 because the sinusoidal path through the mesh deviates less from the ideal helical path. It also means more frequent shifts, which may decrease efficiency depending on the efficiency of the thread-aligners 114, but it would increase the ratio accuracy and lower the shift response time. In a specific embodiment, the first helical gear 104 is split into six gear segments 106.

Helically-split gear segments 118 couple their axial motion and rotation. In some embodiments, the movement of the helically-split gear segments 118 is defined by the following equation:

$$z = r*\sin(\theta)\tan(\Phi)$$

Figure 12:
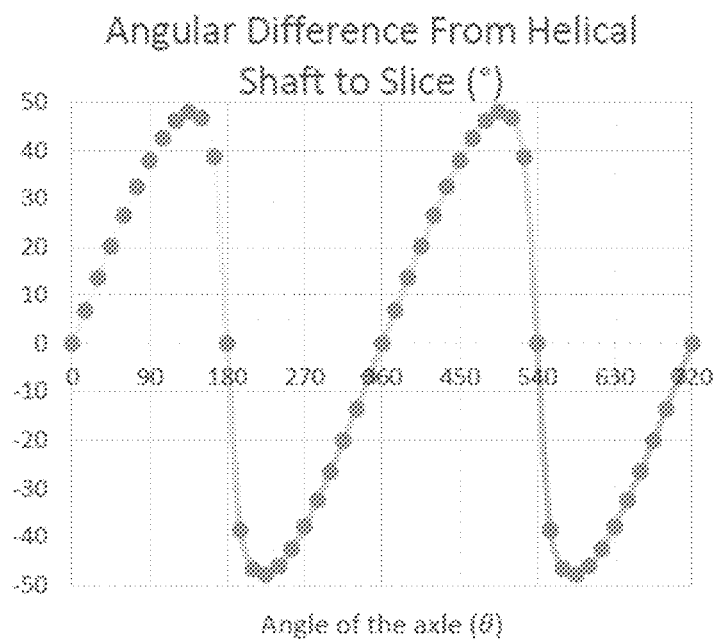
FIG. 12 is a chart showing the angular position of each gear slice relative to the shaft for a positively-engaged infinitely-variable transmission, such as the positively-engaged infinitely-variable transmission illustrated in FIG. 1, in accordance with an example embodiment of the present disclosure.

In these instances, the shaft angle refers to the helically-splined shaft 120, not the straight spline shaft. The equation for the angular position of each gear slice 106 relative to the shaft is difficult to obtain in closed form, but its profile is shown in FIG. 12 using a swashplate 112 angle of 33.51°, a lead of 18 inches, and an effective diameter of 8.625 inches. It is to be noted that these dimensions may be further optimized.

Figure 13:
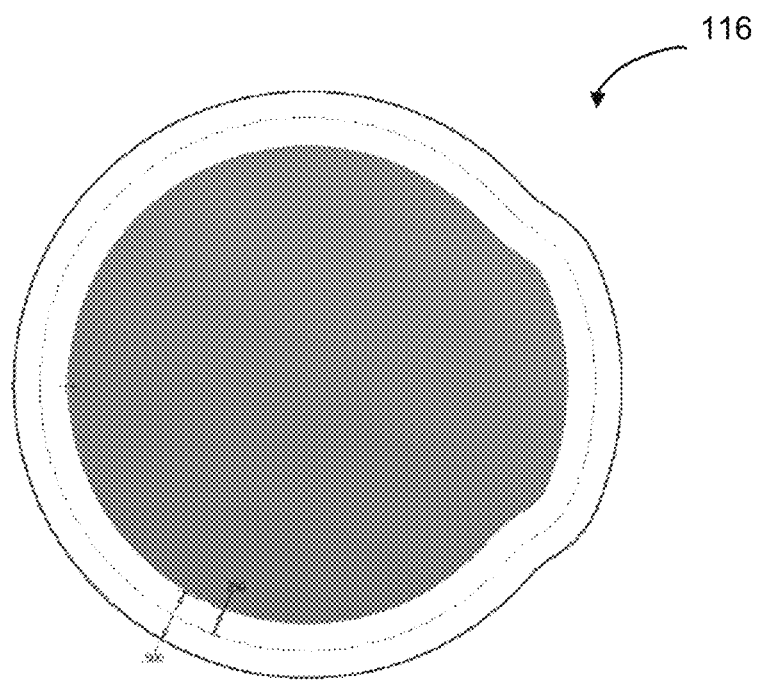
FIG. 13 is a plan view of a radial cam, such as the radial cam illustrated in FIG. 5.

In some embodiments, the radial cam 116 has the profile illustrated in FIG. 13. The radial cam 116 includes two constant velocity sections connected with two mirrored cycloidal sections. Cycloidal sections are used for their property of zero acceleration at both ends. The four variables are the stroke, roller follower radius, angle duration of the cycloidal section ($\theta C$), and angle duration of the lifted flat section ($\theta 1$). $\theta C$ determines the amount of time during which the thread-aligner 114 actuates, and $\theta 1$ determines how long it stays actuated, which is at least the length of gear mesh. The stroke is determined by the length of the rack. The follower radius and cam base diameter shown in the image are arbitrary but do influence pressure angle and the potential for undercutting and should be chosen accordingly.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A positively-engaged infinitely-variable transmission, comprising:
   a gear assembly, the gear assembly including:
      a first helical gear divided into a plurality of radial gear segments, each of the plurality of radial gear segments capable of moving axially along a spline shaft, the spline shaft comprising a straight-splined shaft;
      a second helical gear meshed with the first helical gear; and
      at least one swashplate, the at least one swashplate configured to constrain the axial motion of the plurality of radial gear segments.

2. The positively-engaged infinitely-variable transmission as recited in claim 1, wherein the second helical gear is divided into a second plurality of gear segments.

3. The positively-engaged infinitely-variable transmission as recited in claim 2, wherein each of the second plurality of gear segments is configured to move along a spline shaft.

4. The positively-engaged infinitely-variable transmission as recited in claim 3, wherein the spline shaft comprises a helically-splined shaft.

5. The positively-engaged infinitely-variable transmission as recited in claim 1, further comprising at least one thread-aligner configured to axially align at least a first of the plurality of radial gear segments with at least a second of the plurality of radial gear segments.

6. A positively-engaged infinitely-variable transmission, comprising:

a gear assembly, the gear assembly including:
- a first helical gear divided into a plurality of gear segments, each of the plurality of gear segments configured to move along a spline shaft;
- a second helical gear meshed with the first helical gear; and
- a linkage configured to constrain the axial motion of the plurality of gear segments.

7. The positively-engaged infinitely-variable transmission as recited in claim 6, wherein the spline shaft comprises a straight-splined shaft.

8. The positively-engaged infinitely-variable transmission as recited in claim 6, wherein the second helical gear is divided into a second plurality of gear segments.

9. The positively-engaged infinitely-variable transmission as recited in claim 8, wherein each of the second plurality of gear segments is configured to move along a spline shaft.

10. The positively-engaged infinitely-variable transmission as recited in claim 9, wherein the spline shaft comprises a helically-splined shaft.

11. The positively-engaged infinitely-variable transmission as recited in claim 6, wherein linkage comprises at least one swashplate.

12. The positively-engaged infinitely-variable transmission as recited in claim 6, further comprising at least one thread-aligner configured to axially align at least a first of the plurality of gear segments with at least a second of the plurality of gear segments.

13. A positively-engaged infinitely-variable transmission, comprising:
a gear assembly, the gear assembly including:
- a first helical gear divided into a plurality of gear segments;
- a second helical gear meshed with the first helical gear;
- at least one swashplate, the at least one swashplate configured to constrain the axial motion of the plurality of gear segments; and
- at least one thread-aligner configured to axially align at least a first of the plurality of gear segments with at least a second of the plurality of gear segments.

14. The positively-engaged infinitely-variable transmission as recited in claim 13, wherein each of the plurality of gear segments is configured to move along a spline shaft.

15. The positively-engaged infinitely-variable transmission as recited in claim 14, wherein the spline shaft comprises a straight-splined shaft.

16. The positively-engaged infinitely-variable transmission as recited in claim 13, wherein the second helical gear is divided into a second plurality of gear segments.

17. The positively-engaged infinitely-variable transmission as recited in claim 16, wherein each of the second plurality of gear segments is configured to move along a spline shaft.

18. The positively-engaged infinitely-variable transmission as recited in claim 17, wherein the spline shaft comprises a helically-splined shaft.

* * * * *